United States Patent [19]

Yamada

[11] Patent Number: 5,347,830
[45] Date of Patent: Sep. 20, 1994

[54] ADSORPTION COOLING APPARATUS

[75] Inventor: Yasuo Yamada, Isesaki, Japan

[73] Assignee: Sanden Corp., Isesaki, Japan

[21] Appl. No.: 111,103

[22] Filed: Aug. 24, 1993

[30] Foreign Application Priority Data

Aug. 25, 1992 [JP] Japan .................................. 4-226046

[51] Int. Cl.$^5$ .............................................. F25B 9/14
[52] U.S. Cl. ...................................... 62/481; 62/244; 165/104.12
[58] Field of Search ................. 62/239, 244, 476, 477, 62/480, 481; 165/104.12

[56] References Cited

U.S. PATENT DOCUMENTS

| | | | |
|---|---|---|---|
| 3,270,512 | 9/1966 | Webb | 62/239 |
| 3,309,896 | 3/1967 | Leonard | 62/477 |
| 4,135,371 | 1/1979 | Kesselring et al. | 62/477 |
| 4,574,874 | 3/1986 | Duran | 165/43 |
| 4,660,629 | 4/1987 | Maier-Laxhuber et al. | 165/104.12 |
| 5,005,371 | 4/1991 | Yonezawa et al. | 62/236.6 |

FOREIGN PATENT DOCUMENTS 62-5060  1/1987  Japan .

OTHER PUBLICATIONS

"A Study of Dual Zeolite-Water Absorption System for Automotive Air Conditioning" Jun. 1, 1992 International Symposium on Automotive Technology and Automation.

Primary Examiner—Henry A. Bennett
Assistant Examiner—William C. Doerrler
Attorney, Agent, or Firm—Kenjiro Hidaka

[57] ABSTRACT

An adsorption cooling apparatus includes a hermetically sealed cylindrical capsule that contains a first thermal medium, a moisture absorber on its first side and an adsorbent on its second side. The capsule reciprocatively moves and slidably contacts with a cooling vessel containing a low temperature thermal medium on the first side and with a heating vessel containing a high temperature thermal medium on the second side. The capsule is cooled by an external airflow when it is moved to the cooling vessel, so that the first thermal medium absorbed in the moisture absorber evaporates and the low temperature thermal medium in the cooling vessel is cooled because of the latent heat of evaporation of the first thermal medium. The so cooled low temperature thermal medium is utilized for cooling the object to be cooled. The first thermal medium having evaporated from the moisture absorber is adsorbed by the adsorbent. When the capsule has moved to the heating vessel, the adsorbent is heated by the heating vessel, and the first thermal medium having been adsorbed in the adsorbent is desorbed and released from the adsorbent. The first thermal medium so released is again absorbed by the moisture absorber when the capsule has moved back to the cooling vessel, and the capsule is cooled again by the airflow to repeat the cycle.

4 Claims, 4 Drawing Sheets

ADSORPTION COOLING APPARATUS

BACKGROUND OF THE INVENTION

1. Field of the Invention

The present invention relates to a cooling apparatus, particularly an adsorption type cooling apparatus that is applicable to an air-conditioning system of automobiles, vessels, residences, or shipping containers for food products or medical products that require refrigeration.

2. Description of the Prior Art

Prior known cooling apparatuses for air-conditioning or refrigeration include a well-known conventional heat pump system and, more recently, an adsorption system that uses adsorbents such as zeolite.

The prior technology is exemplified by what is described in Japanese Laid-Open Patent Application 61-139098, filed Jun. 14, 1986, Laid-Open No. 62-5060, laid-open Jan. 12, 1987, priority being claimed on West Germany (DE) Patent Application P3521484.8, filed Jun. 14, 1985.

The present applicant has disclosed improved adsorption-type cooling systems in copending U.S. applications, Ser. Nos. 08/066,984 filed May 25, 1993 and 08/085,323 filed Jun. 29, 1993.

Figure 6A:
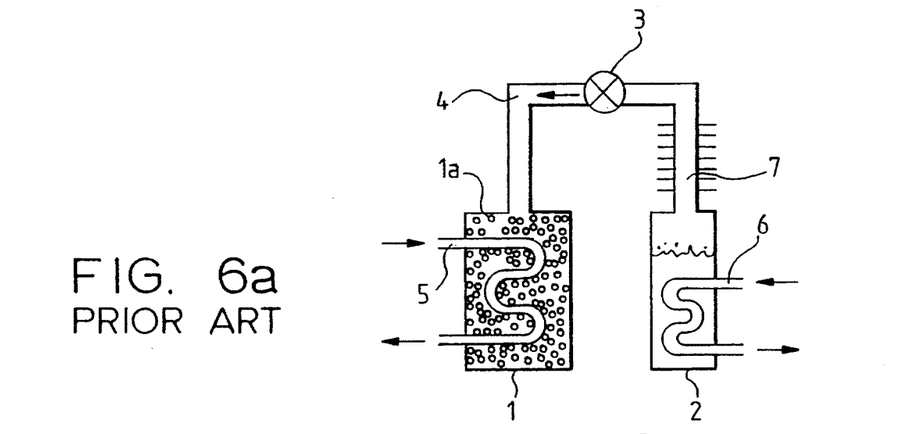
FIGS. 6a and 6b show a basic principle of a prior known single-adsorber type adsorption cooling system.
Figure 6B:
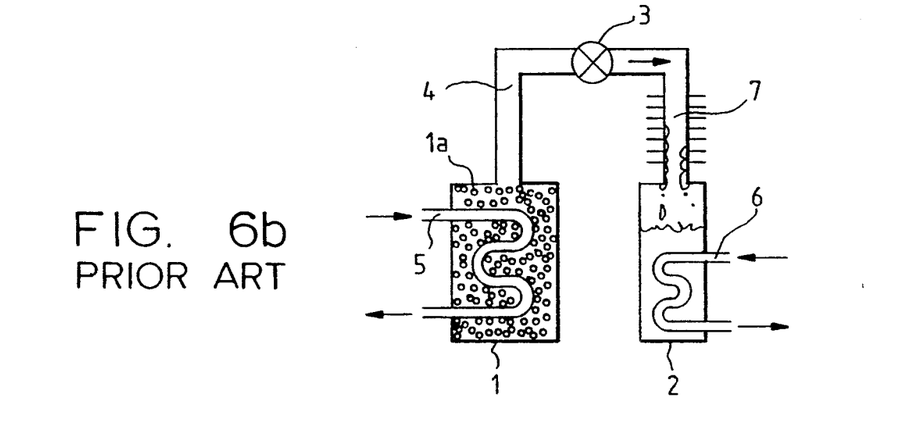

FIGS. 6a and 6b illustrate a basic principle of a prior known single-adsorber type adsorption cooling system. In FIG. 6a, an adsorber 1 is connected with a cooling vessel 2 by a tubular passage 4 having a shutoff valve 3. The adsorber 1 houses adsorbent 1a such as zeolite, and a heat exchange pipe 5 that is in contact with the adsorbent 1a. The cooling vessel 2 contains water as an adsorption medium (adsorbate) which is in thermal contact with a cooling pipe 6. The air that is to be cooled is circulated through the cooling pipe 6. The adsorber 1, the cooling vessel 2 and the tubular passage 4 constitute a closed system which is evacuated of air. A condenser 7 for exchanging heat with the ambient air is provided on the tubular passage 4 near the cooling vessel 2.

With this cooling system, when the valve 3 is opened, the water inside the cooling vessel 2 evaporates into water vapor and shifts through the tubular passage 4, in the direction shown by the arrow, into the adsorber 1 to be adsorbed by the adsorbent 1a by its adsorption action. Because of this, when the water in the cooling vessel 2 evaporates, the latent heat of evaporation is consumed in the cooling vessel 2, so that the temperature in the cooling vessel 2 declines so as to cool the air inside the cooling pipe 6. This operation is called an adsorption process.

Next, an explanation will be made on the operation whereby the water adsorbed by the adsorbent 1a is returned to the cooling vessel 2.

Referring to FIG. 6b, a high temperature gas from an external heat source is provided through the heat exchange pipe 5 to heat the adsorbent 1a and thereby desorb and separate the water adsorbed therein. Then, the separated water in a state of vapor is driven through the tubular passage 4, in the direction shown by the arrow, to the condenser 7, where the water vapor turns into liquid water and is recovered in the cooling vessel 2. This operation is called a desorption process.

The adsorption here means a state where the water molecules are retained among the molecules of the adsorbent. Reversely, in the desorption action, the water molecules are desorbed and separated from the molecules of the adsorbent as the adsorbent is heated.

However, the single-adsorber type adsorption cooling system described above is incapable of continuous cooling because the adsorption process and the desorption process must be done alternately in the same system. With this in mind, a dual-adsorber type adsorption cooling system as shown in FIG. 7 has been proposed.

Figure 7:
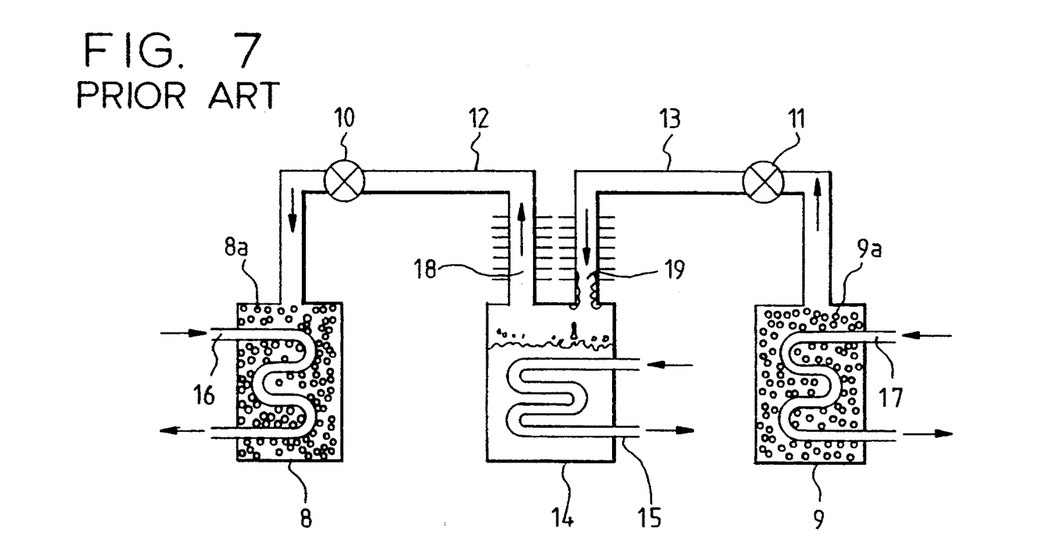
FIG. 7 shows a basic principle of a prior known dual-adsorber type adsorption cooling system.

In FIG. 7, two adsorbers 8, 9 are individually connected to a single cooling vessel 14 by tubes 12, 13, which respectively have shutoff valves 10, 11. The water in the cooling vessel 14 is thermally contacted by a cooling pipe 15 in the same manner as in the case of the single-adsorber type adsorption cooling system described above. Adsorbents 8a, 9a in the adsorbers 8, 9 are also in thermal contact with heat exchange pipes 16, 17, respectively, and condensers 18, 19 are provided on the tubes 12, 13, respectively.

With this cooling system, while the adsorption process is performed at one adsorber, at, for example, the adsorber 8, the desorption process is simultaneously performed at the other adsorber 9. Then, the two adsorbers 8, 9 carry out a switching operation whereby they work in reverse when their respective processes have been completed. Since the adsorber 9 is at high temperature when the desorption operation has been completed, low or ambient temperature air is provided through the heat exchange pipe 17 to cool the adsorbent 9a. Continuous cooling in the cooling vessel 14 is thus made possible by periodically repeating such operation.

Problems to be Resolved

With the conventional adsorption type cooling systems as described above, either single-adsorber type or dual-adsorber type, the systems are composed of discrete components such as adsorber, cooling vessel, pipings or valves. Therefore, complicated construction and bulkiness of the systems have been the disadvantages. Since an air-conditioning system used for a vehicle have a limited installation space, bulkiness of the system makes it difficult for vehicle application.

SUMMARY OF THE INVENTION

The present invention was accomplished with a view to the above described problems.

A primary object of the present invention is to provide an adsorption type cooling apparatus that is simple in construction and compact in size.

Another object of the present invention is to provide an adsorption type cooling apparatus that has an enhanced COP (Coefficient of Performance).

In order to achieve the above mentioned objects, the cooling apparatus of the present invention has at least one pair of a first capsule and a second capsule, both cylindrically formed, hermetically sealed and made of a thermally conductive material. Each of the capsules contains a first thermal medium, a moisture absorber on one side that can absorb the first thermal medium and an adsorbent on the other side that adsorbs the first thermal medium at a low temperature and desorbs it at a high temperature. Between the moisture absorber and the adsorbent in each of the capsules is a vacant space.

The apparatus further includes a cooling vessel containing a low temperature second thermal medium which is used for cooling an object to be cooled by the apparatus. The cooling vessel has a first cooling hole and a second cooling hole into which the first and the second capsules, respectively, can be slidably fitted on the side the moisture absorber is enclosed. The apparatus additionally includes a heating vessel containing a high temperature third thermal medium. The heating vessel has a first heating hole and a second heating hole into which the first and the second capsules, respectively, can be slidably fitted on the side the adsorbent is enclosed.

The first and the second capsules are reciprocally and periodically moved by an actuator in a manner that the first capsule is moved into the first cooling hole while, simultaneously, the second capsule is moved in the opposite direction into the second heating hole and, next, reversely, the first capsule is moved into the first heating hole while, simultaneously, the second capsule is moved into the second cooling hole.

Both the capsules have external heat dissipating fins that are exposed to an external cooling airflow only when either capsule has been moved into the corresponding cooling hole. When either capsule, which has moved into the cooling hole, is cooled by the airflow the first thermal medium absorbed in the moisture absorber in the capsule evaporates and adsorbed by the adsorbent on the opposite side within the same capsule, whereby the second thermal medium in the cooling vessel is cooled because of a latent heat of evaporation of the first thermal medium, and the so cooled second thermal medium is used to cool the object to be cooled by the apparatus. Simultaneously, the other capsule that has moved into the corresponding heating hole is heated by the heating vessel on the side the adsorbent is enclosed, so that the adsorbent is heated and the first thermal medium adsorbed in the adsorbent being heated is desorbed and released from the adsorbent and the so released first thermal medium is again absorbed by the moisture absorber within the same capsule.

The first cooling hole and the second cooling hole contain a fourth thermal medium and the two cooling holes are communicated with each other so that the fourth thermal medium in the first cooling hole can shift into the second cooling hole when the first capsule slides into the first cooling hole and, reversely, the fourth thermal medium in the second cooling hole can shift into the first cooling hole when the second capsule slides into the second cooling hole.

The apparatus further has a temperature sensor to measure the temperature of the third thermal medium and a switching controller for, responsive to the temperature measured by the temperature sensor, controlling the cycle period of the actuation of the actuator for reciprocally and periodically moving the capsules so that the cycle period is made long when the measured temperature is low and the cycle period is made short when the measured temperature is high.

DESCRIPTION OF THE PREFERRED EMBODIMENTS

Figure 1:
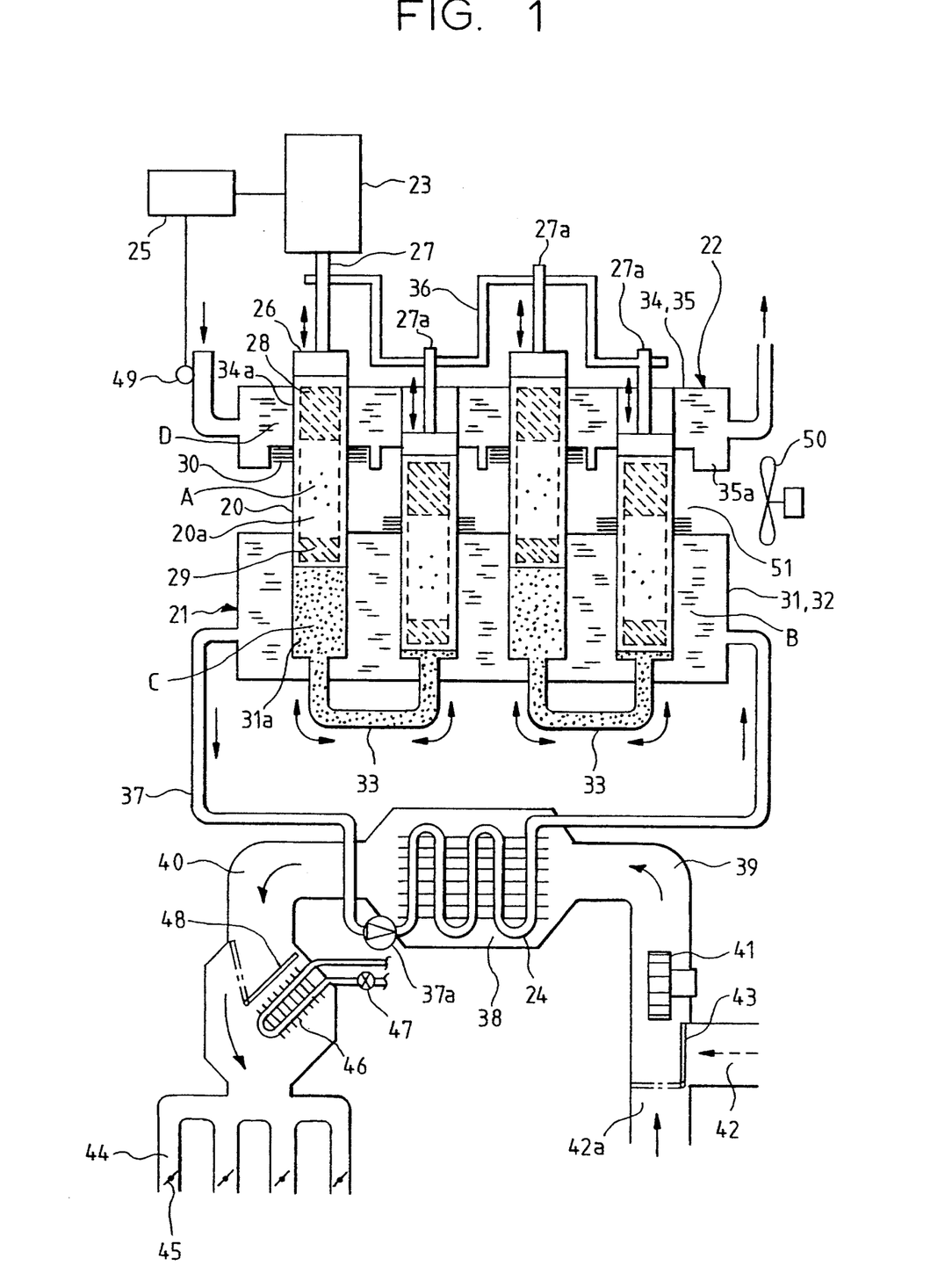
FIG. 1 is a general diagrammatical view of an air-conditioning system for an automobile including an adsorption cooling apparatus according to the present invention.
Figure 2A:
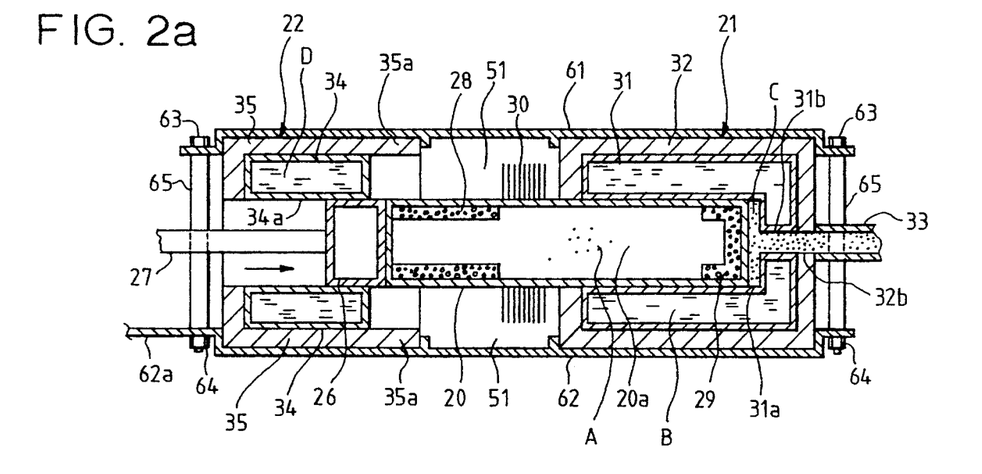
FIGS. 2a is a detail sectional view of an essential part of the adsorption cooling apparatus shown in FIG. 1, particularly showing an adsorption-desorption capsule shifted to a cooling side of the apparatus.
Figure 2B:
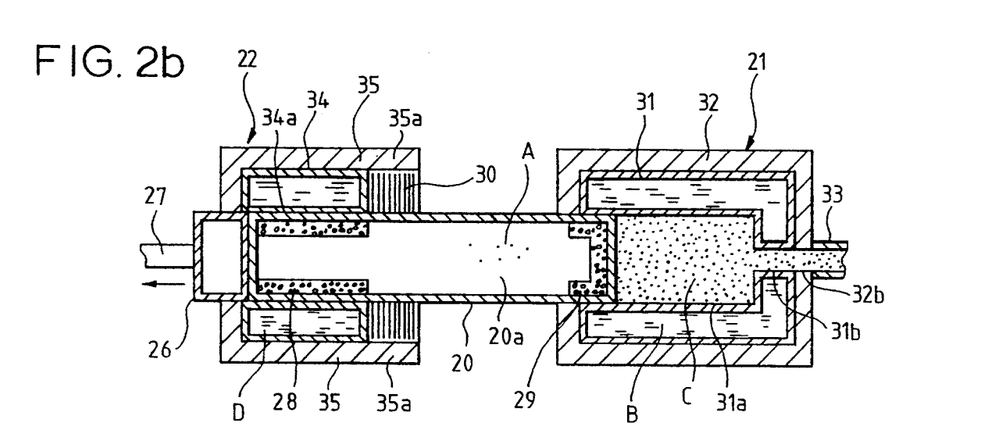
FIGS. 2b is a similar detail sectional view of the essential part of the adsorption cooling apparatus shown in FIG. 2a excluding a supporting frame, where the capsule is shifted to a heating side of the apparatus.
Figure 3:
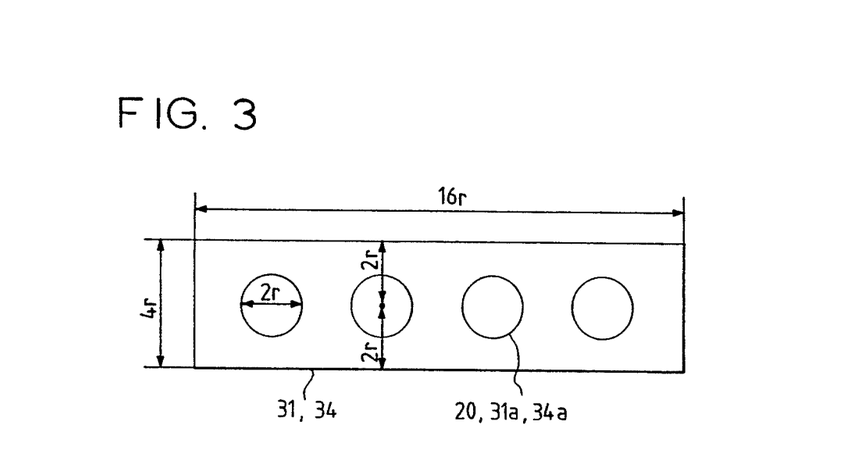
FIG. 3 is a diagrammatical sectional view illustrating a positional relation of four adsorption-desorption capsules and a heating reservoir or a cooling reservoir of the adsorption cooling apparatus shown in FIG. 1.

FIGS. 1 to 3 are for an adsorption cooling apparatus of the present invention employed in an air-conditioning system for an automobile.

Figure 4:
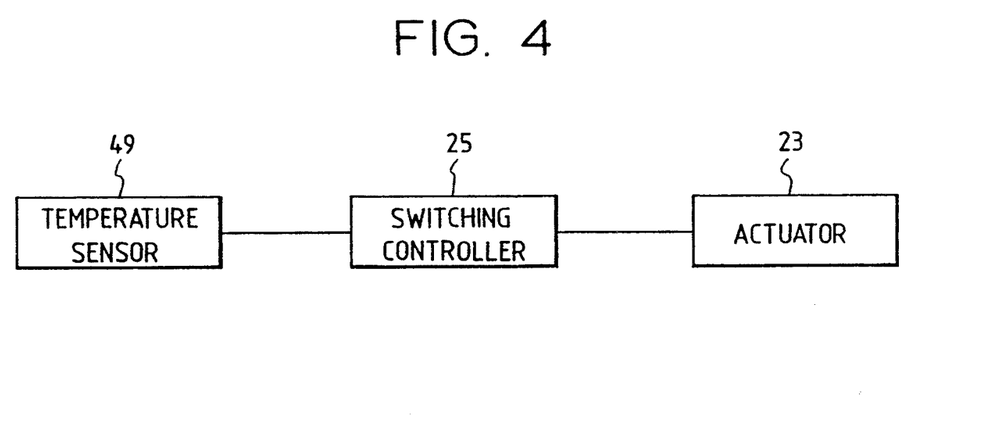
FIG. 4 is a block diagram of a control system of the adsorption cooling apparatus shown in FIG. 1.

In FIGS. 1 to 3, numeral 20 denotes four units of hermetically sealed adsorption-desorption capsules; 21 denotes a cooling section disposed on one side of the capsules 20; 22 denotes a heating section disposed on the other side of the capsules 20; 23 denotes an actuator that reciprocally moves the capsules 20; and 24 denotes a heat exchanger installed in the automobile. In FIGS. 1 and 4, numeral 25 denotes a switching controller that controls the actuator 23.

FIGS. 2a and 2b show details of an essential part of the adsorption cooling apparatus of the present invention, particularly one of the four units of the adsorption-desorption capsules 20 and directly related components thereto. In FIG. 2a, the capsule 20 is shown shifted to the cooling side (right-hand side as viewed in FIG. 2a) or toward the cooling section 21, and in FIG. 2b to the heating side (left-hand side as viewed in FIG. 2b) or toward the heating section 22.

Since each of the capsules 20 and the related components have basically the same construction, detail explanation will now be made on one of the capsules in reference to FIG. 2a.

The capsule 20 is hermetically completely sealed and enclosed and has a cylindrical shape with both the ends closed. On one end of the capsule 20, a heat shield 26 is securely attached to the capsule 20. The heat shield 26 is in an enclosed hollow cylindrical construction having the same outside diameter as of the capsule 20. The heat shield 26 is made of a mechanically strong engineering type plastic material, such as a polyacetal resin.

The capsule 20 contains an adsorbent 28, such as of zeolite, on one side (left-hand side as viewed in FIG. 2a) thereof and a moisture absorber 29 on the other side (right-hand side as viewed in FIG. 2a). The adsorbent 28 is also cylindrically formed and the moisture absorber 29 is formed in a shape of a cup, both of which are disposed in contact with the inside walls of the capsule 20. The end of the cup-shaped moisture absorber 29 is against one circular side wall in the capsule 20. The moisture absorber 29 is made of a material such as sponge. The capsule also contains an adsorbate A, a thermal medium, such as water. The adsorbent 28 can adsorb the adsorbate A at a low temperature and can desorb and release it at a high temperature. The adsorbate A can be kept absorbed by the moisture absorber 29 until the capsule is cooled and the adsorbate A evaporates from the moisture absorber 29. Between the adsorbate 28 and the moisture absorber 29 in the capsule is a vacant space 20a. Heat dissipating fins 30 are fixedly mounted on the outside of the capsule 20.

In reference to FIGS. 1 and 2a, the cooling section 21 includes a cooling vessel 31, which has four columnar-shape cooling holes 31a, as will be mentioned in detail later. The cooling vessel 31 is filled with an antifreezing low temperature thermal medium B, such as ethylene glycol or brine, and is covered with a heat shielding wall 32 so as to be thermally shielded from the environment. The heating section 22 includes a heating vessel 34, which has four columnar-shape heating through-holes 34a, as mentioned in detail later. Each of the capsules 20 slidably fits into one of the cooling holes 31a of the cooling vessel 31 on one side thereof (i.e. on the side where the moisture absorber 29 is located) and into one of the heating through-holes 34a of the heating vessel 34 on the other side thereof (i.e. on the side where the adsorbent 28 is located). The capsules 20, the fins 30, the cooling vessel 31 and the heating vessel 34 are made of a good heat conducting material such as an aluminum alloy.

The cooling section 21 and the heating section 22 are supported and kept aligned with each other by a top supporting plate 61, a bottom supporting plate 62, bolts 63, nuts 64 and spacer collars 65. Between the cooling section 21 and the heating section 22 and inside the upper and the lower supporting plates 61, 62 is formed an airflow duct 51 through which cooling airflow passes. The cooling airflow is produced by a cooling fan 50 shown in FIG. 1.

FIG. 3 is a diagrammatical sectional view illustrating an arrangement of the four capsules 20, the four cooling holes 31a and the four heating through-holes 34a with respect to the cooling vessel 31 or the heating vessel 34, as viewed from the top side in FIG. 1. The rectangular frame shown in FIG. 3 represents the external periphery of the cooling vessel 31 or the heating vessel 34 and the four circles diametrically represent the capsules 20, the cooling holes 31a of the cooling vessel 31 or the heating through-holes 34a of the heating vessel 34. As shown in FIGS. 1 and 3, the four capsules 20 are arranged in a straight alignment sideways, evenly spaced, and longitudinally in parallel with each other. In the present embodiment, the four capsules 20 are arranged longitudinally horizontal.

As shown in FIG. 3, the shorter side of the cooling vessel 31 or the heating vessel 34 has a length approximately equal to two times the diameter ($2r$) of the capsules 20 and the longer side thereof approximately four times the diameter ($2r$). The actual diameter ($2r$) of the capsules 20 of the present embodiment is approximately 1 inch and the length thereof approximately 5 inches.

As shown in FIGS. 2a and 2b, the cooling vessel 31 and the heat shielding wall 32 have circular path holes 31b and circular path holes 32b, respectively, which are formed concentrically with the corresponding columnar cooling holes 31a of the cooling vessel 31. As shown in FIGS. 1 and 2a, each pair of the adjacent cooling holes 31a are connected with each other by a pipe 33 so that the connected pair of the holes 31a are communicated with each other through the corresponding path holes 31b, path holes 32b and the pipe 33. Although not shown, the pipes 33 are also covered with heat shielding material so that the inside of the pipes 33 are thermally shielded from the environment.

The cooling holes 31a, the path holes 31b, the path holes 32b and the pipes 33 are filled with an antifreezing low temperature thermal medium C, such as ethylene glycol or brine.

Referring to FIGS. 1, 2a and 3, the four heating through-holes 34a are concentrically aligned with the four respective cooling holes 31a so that the four respective capsules 20 slidably fit in the respective cooling holes 31a and the heating holes 34a maintaining close contacts with the cooling vessel 31 and the heating vessel 34. A high molecule synthetic lubricant, such as silicon grease, is applied to the surfaces where the capsules 20 make sliding contacts with the cooling vessel 31 and the heating vessels 34.

A high temperature engine coolant, such as water, of the automobile (not shown) is passed through the inside of the heating vessel 34 as a high temperature thermal medium D. The heating vessel 34 is covered with a heat shielding wall 35 so as to be thermally shielded from the environment. One end part 35a of the heat shielding wall 35 is extended toward the cooling section 31 so that the heat dissipating fins 30 of each of the capsules 20 can be accommodated into this end part 35a when the capsules are shifted to the heating section 22, as shown in FIG. 2b. The fins 30 accommodated in the extended end part 35a of the heat shielding wall 35 are not exposed to the cooling airflow produced by the fan 50.

Referring to FIGS. 1, 2a, 2b and 4, although not shown in detail, the actuator 23 shown in FIGS. 1 and 4 is a reciprocally actuating mechanism having a driving unit such as a solenoid, electric motor or air-cylinder. One of the four heat shields 26 and the actuator 23 is connected with each other by a first connecting rod 27 so that the actuator 23 reciprocally moves the capsule 20. Other three connecting rods 27a are also connected individually with three other respective heat shields 26 and driveably linked to the first connecting rod 27 by a rotary eccentric linking arm 36 so that all of the four connecting rods 27 and 27a are directly or indirectly driveably connected with the actuator 23, as shown in FIG. 1.

The connections between the actuator 23 and the connecting rods 27 and 27a are made in a manner that a pair of capsules 20 adjacent to each other are moved in the opposite directions each other, as shown in FIG. 1. Since all of the capsules 20 are connected with the respective rods 27 or 27a through the respective heat shields 26, each pair of the capsules 20 fit into the respective cooling holes 31a, which are paired and communicating with each other through the pipe 33, also move in the opposite directions each other when driven by the actuator 23.

Referring to FIG. 2a, an end part 62a of the lower supporting plate 62 is further extended, though not entirely shown in the figure. The actuator 23 and the linking mechanism are mounted on the extended part of the lower supporting plate 62.

Referring now to FIG. 1, numeral 24 denotes a heat exchanger for air-conditioning of the vehicle compartment. The heat exchanger 24 includes a part of a cooling pipe 37 that is connected to the cooling vessel 31 so that the low temperature cooling medium B in the cooling vessel 31 is made to circulate through the cooling pipe 37 by means of a pump 37a provided in the cooling pipe 37 so as to cool the heat exchanger 24. The heat exchanger 24 is placed in a heat exchange chamber 38 which communicates with a vehicle room air intake blower passage 39 at one end and an exhaust blower passage 40 at the other end in a construction that is known in a conventional automobile air-conditioning apparatus as described next.

That is, a blower 41 is provided in the intake blower passage 39, while an external air intake 42 branches off the intake blower passage 39 with a flap 43, so that the inlet of the air intake blower passage 40 can be switched to the external air intake 42 from an internal air intake 42a by turning the flap 43 to the position shown by broken lines. The exhaust blower passage 40 branches into plural exhaust openings 44 which are provided at places in the vehicle compartment such as on or under the dashboard. A louver 45 is provided in each of the exhaust openings 44. A heating pipe 46, which is connected to the vehicle engine radiator (not shown), is provided in the exhaust blower passage 40 and is used for the purpose of heating or demoisturizing of the air in the vehicle compartment, if and when the air in the compartment should be heated rather than cooled. The heating pipe 46 has a shutoff valve 47. By opening the valve 47, the heated engine coolant circulates through the heating pipe 46 so as to heat the air in the exhaust air passage 40. A deflector flap 48 is provided in the exhaust blower passage 40 on the upstream side of the heating pipe 46, so that the amount of the air passing through the heating pipe 46 can be regulated by setting the deflector flap 48 to a proper angle.

Figure 5:
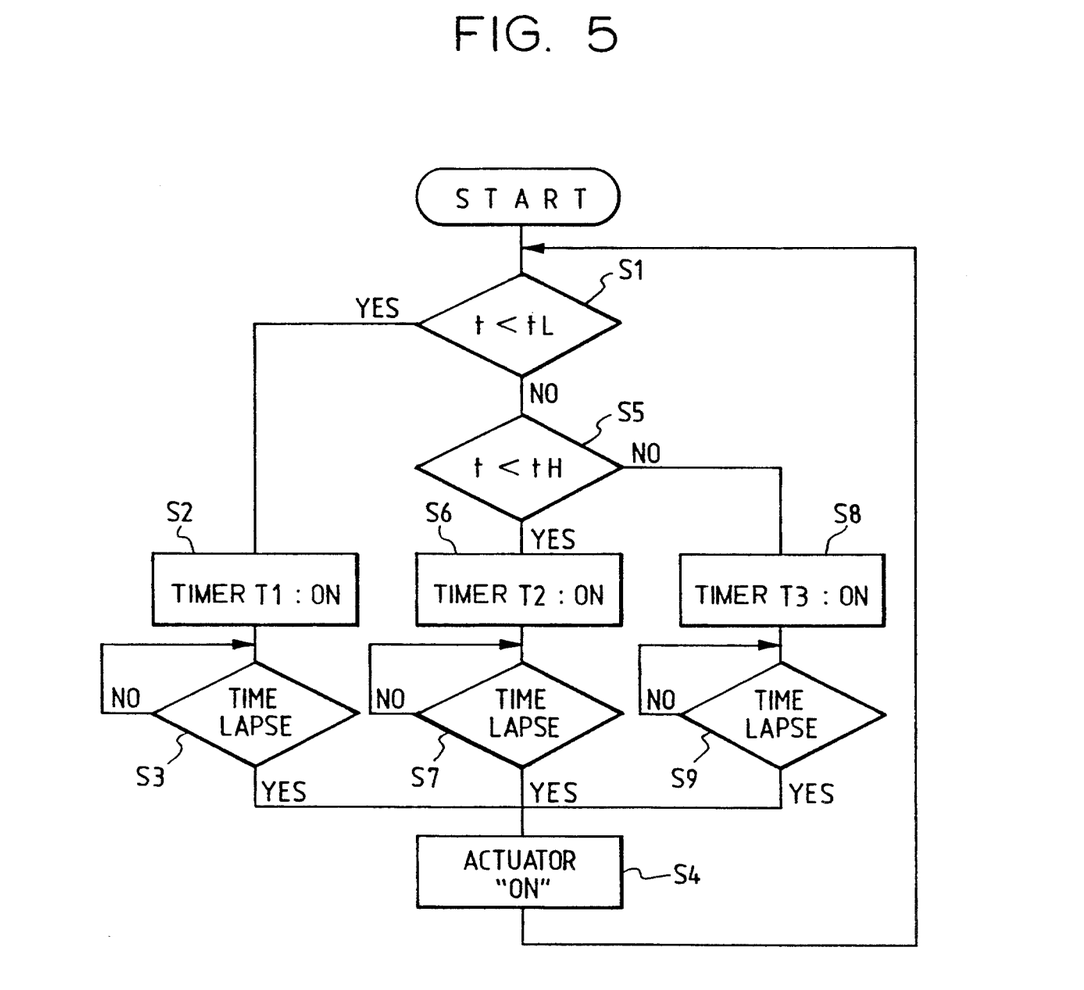
FIG. 5 is a flow chart of a switching controller of the adsorption cooling apparatus shown in FIG. 1.

FIG. 4 is a block diagram of a control system of the adsorption cooling apparatus and FIG. 5 is a flow chart of a switching controller 25 of the cooling apparatus.

Referring to FIGS. 1, 4 and 5, the switching controller 25 includes a microcomputer and is electrically connected to the actuator 23. The switching controller 25 has three timers T1, T2 and T3, which are individually set for predetermined time periods $T_1$, $T_2$ and $T_3$, respectively, where $T_1 > T_2 > T_3$.

A temperature sensor 49 is provided so as to measure the temperature of the engine coolant, i.e the high temperature thermal medium D, at the area where the coolant enters the heating vessel 34. The switching controller 25 is also preset for a high temperature limit tH and a low temperature limit tL for the temperature t measured by the temperature sensor 49. The temperature range between the high and the low temperature limits, tH and tL, is regarded as a standard temperature range, within which the desorbing function of the adsorbent 28 can be properly performed.

Referring now to FIGS. 1, 2a and 2b, when the capsule 20 has moved to the side of the cooling section 21 (as shown in FIG. 2a), the heat dissipating fins 30 on the capsule 20 are not accommodated in the extended part 35a of the heat shielding wall 35. Therefore, the fins 30 will be subjected to the airflow produced by the externally installed cooling fan 50 (FIG. 1). Thus, the capsules 20 whose fins 30 are subjected to the airflow will be cooled by the heat dissipating effect of the fins 30. Then, the adsorbate A that has been retained by the moisture absorber 29 in each of the capsules 20 being cooled will evaporate under a low pressure therein and the vapor of the adsorbate A so released from the moisture absorber 29 will then be adsorbed by the adsorbent 28 within the same capsule 20. At that time, because of the latent heat of evaporation in the capsule 20, the heat inside the cooling vessel 31 will be lost to the capsule 20 and the cooling medium B in the cooling vessel 31 will be cooled.

Next, as shown in FIG. 2b, when the sealed capsule 20 is moved to the side of the heating section 22, the adsorbent 28 in the capsule 20 is heated by the heating vessel 34. Then, adsorbate A that has been adsorbed in the adsorbent 28 in the capsule 20 will be desorbed and separated from the adsorbent 28 under a high temperature and an increased pressure because of the rise of the temperature. The adsorbate A so released from the adsorbent 28 will be absorbed and retained again by the moisture absorber 29 within the same capsule 20. During that heating, because the heat dissipating fins 30 of that particular capsule 20 are located inside the extended part 35a of the heat shielding wall 35, the heat dissipation from the fins 30 will not be occur and, accordingly, the capsule 20 will not be cooled. In other words, the capsules 20 are cooled by the airflow produced by the cooling fan 50 only when they have moved to the side of the cooling section 21, but the capsules 20 are not cooled when they have moved to the side of the heating section 22.

As the capsules 20 are reciprocally and periodically moved by the actuator 23 and the linking mechanism, above mentioned cooling operation is repeatedly and continually performed with each of the capsules 20, On the other hand, since the cooling holes 31a are paired and each of the paired cooling holes 31a are communicated with each other through the corresponding path holes 31b, 31c and the pipe 33 and the corresponding paired capsules 20 always move in the opposite directions from each other, when one capsule 20 is moved into a cooling hole 31a the thermal medium C in that cooling hole 31a is displaced by the capsule 20 and driven into the other cooling hole 31a through the corresponding path holes 31b, 32b and the pipe 33. Since the pipes 33 are also thermally shielded as mentioned before, the thermal medium C has no direct thermal contact with the environment.

The operation of the actuator 23 is controlled by the switching controller 25. Since the heat quantity of the engine coolant varies depending on the rotational speed of the engine or the driving condition of the vehicle, it is desirable to control the cycle period of the reciprocative movements (i.e. the switching period) of the capsules 20. In this connection, an explanation will next be made on the function of a switching controller 25 in reference to the control flowchart of FIG. 5.

In FIG. 5, after the operation of the actuator 23 is started, if, for example, the temperature t picked up by the temperature sensor 49 is judged to be lower than the predetermined low limit value tL (S1) in the controller 25, the timer T1 is turned on (S2), and the switching period for the reciprocal movements of the capsules 20 is set for a predetermined longest time period. After the preset longest time period of the timer T1 has elapsed (S3), the driving unit 23 is turned on (S4), and the sequence returns to the first step S1.

If, for example, the temperature t picked up by the temperature sensor 49 is judged to be higher than the predetermined low limit value tL (S1) but lower than the predetermined high limit value tH (S5) in the controller 25, the timer T2 is turned on (S6), and the switching period for the reciprocal movements of the capsules 20 is set for a predetermined standard time period. After the preset standard time period of the timer T2 has elapsed (S7), the driving unit 23 is turned on (S4), and the sequence returns to the first step S1.

If, for example, the temperature t picked up by the temperature sensor 49 is not only judged to be higher than the predetermined low limit value tL (S1) but also judged to be even higher than the predetermined high limit value tH (S5), the timer T3 is turned on (S8), and the switching period for the reciprocal movements of the capsules 20 is set for a predetermined shortest time period. After the preset shortest time period of the timer T3 has elapsed (S9), the driving unit 23 is turned on (S4), and the sequence returns to the first step S1.

The rotational speed of the vehicle engine or the driving speed of the vehicle, instead of the temperature of the heated engine coolant, may be made the basis for calculating the quantity of the available heat for heating the capsules 20. The exhaust gas of the engine, instead of the engine coolant, may also be utilized for heating the capsules 20.

Next, the effects and the advantages of the adsorption cooling apparatus of the present invention will be explained. The apparatus has eliminated substantial parts that are required for conventional cooling systems and, therefore, made the apparatus simple and compact. Accordingly, the apparatus can be suitably used for a vehicle that has a limited installation space. By employing paired adsorption-desorption capsules 20 alternatively moving, in opposite directions to each other, to the cooling section 21 or to the heating section 22, the thermal medium B in the cooling vessel can be continuously cooled and, therefore, the cooling capacity of the apparatus can be maintained at a constant level. The heat loss at the cooling section 21 is minimized and any undesirable dew condensation can be avoided because not only the cooling vessel 21 but also the thermal medium C contained in the paired cooling holes 31a and the pipes 33 are thermally shielded from the environment. The adsorbent 28 in each capsule 20 can be heated for a just right period of time for each desorption because the cycle period of the reciprocative movements of the capsule is automatically adjusted to the quantity of the available heat, which may vary, for heating the adsorbent. Thus, the COP (Coefficient of Performance), or the cooling efficiency, and the total cooling capacity of the apparatus are enhanced.

It will be understood that various changes and modifications may be made in the above described embodiments which provide the characteristics of the present invention without departing from the spirit and principle thereof particularly as defined in the following claims.

What is claimed is:

1. An adsorption cooling apparatus, comprising:
   (a) a hermetically sealed capsule made of a thermally conductive material, said capsule having a first side and a second side and containing a first thermal medium, a moisture absorber on said first side that can absorb said first thermal medium and an adsorbent on said second side that can adsorb said first thermal medium at a low temperature and can desorb said first thermal medium at a high temperature, between said moisture absorber and said adsorbent in said capsule being a vacant space;
   (b) a cooling vessel containing a low temperature second thermal medium that is used for cooling an object to be cooled by the apparatus, aid cooling vessel having a cooling hole into which said capsule can be slidably fitted on said first side;
   (c) a heating vessel containing a high temperature third thermal medium, said heating vessel having a heating hole into which said capsule can be slidably fitted on said second side;
   (d) means for reciprocally and periodically moving said capsule in a manner that said capsule is moved into said cooling hole on said first side and, reversely, said capsule is moved into said heating hole on said second side; and
   (e) means for cooling said capsule that has been moved into said cooling hole on said first side so that said first thermal medium adsorbed by said adsorbent within said capsule while the capsule is cooled, whereby said second thermal medium in said cooling vessel is cooled because of a latent heat of evaporation of the first thermal medium, said adsorbent being heated by said heating means when said capsule is moved into said heating hole on said second side so that said first thermal medium adsorbed in said adsorbent in the capsule is desorbed and released from said adsorbent and the so released first thermal medium is again absorbed by said moisture absorber within said capsule;
   wherein said means for cooling said capsule includes heat dissipating fins externally mounted on said capsule and a cooling fan to produce a cooling airflow so that said fins are subjected to said airflow when said capsule is moved into said cooling hole on aid first side.

2. An adsorption cooling apparatus, comprising:
   (a) a first hermetically sealed capsule and a second hermetically sealed capsule, both being made of a thermally conductive material, each of said capsules having a first side and a second side and containing a first thermal medium, a moisture absorber on said first side that can absorb said first thermal medium and an adsorbent on said second side that can adsorb said first thermal medium at a low temperature and can desorb said first thermal medium at a high temperature, between said moisture absorber and said adsorbent in each of said capsules being a vacant space;
   (b) a cooling vessel containing a low temperature second thermal medium that is used for cooling an object to be cooled by the apparatus, said cooling vessel having a first cooling hole into which said first capsule can be slidably fitted on said first side and a second cooling hole into which said second capsule can be slidably fitted on said first side;
   (c) a heating vessel containing a high temperature third thermal medium, said heating vessel having a first heating hole into which said first capsule can be slidably fitted on said second side and a second heating hole into which said second capsule can be slidably fitted on said second side;
   (d) means for reciprocally and periodically moving said capsules in a manner that said first capsule is moved into said first cooling hole on said first side while simultaneously said second capsule is moved into said second heating hole on said second side and, then, reversely, said first capsule is moved into said first heating hole on said second side while simultaneously said second capsule is moved into said second cooling hole on said first side; and
   (e) means for cooling either capsule at a time that has been moved into the corresponding cooling hole on the first side thereof so that said first thermal medium adsorbed by said moisture adsorbent in the capsule having moved into the cooling hole evaporates and adsorbed by said adsorbent within the same capsule while the capsule is cooled, whereby said second thermal medium in said cooling vessel is cooled because of a latent heat of evaporation of the first thermal medium, simultaneously, the other capsule that has been moved into the corresponding heating hole on the second side thereof is heated by said heating vessel, so that said first thermal medium adsorbed in said adsorbent in the capsule is desorbed and released from aid adsorbent and the so released first thermal medium is again absorbed by said moisture absorber within the same capsule;

wherein said means for cooling either capsule at a time includes heat dissipating fins externally mounted on each of said first capsule and said second capsule and a cooling fan to produce a cooling airflow so that the fins of the capsule that has been moved into the corresponding cooling hole on the first side thereof are subjected to said airflow.

3. An adsorption cooling apparatus, comprising:
(a) a first hermetically sealed capsule and a second hermetically sealed capsule, both being made of a thermally conductive material, each of said capsules having a first side and a second side and containing a first thermal medium, a moisture absorber on said first side that can absorb said first thermal medium and an adsorbent on said second side that can adsorb said first thermal medium at a low temperature and can desorb said first thermal medium at a high temperature, between said moisture absorber and said adsorbent in each of said capsules being a vacant space;
(b) a cooling vessel containing a low temperature second thermal medium that is used for cooling an object to be cooled by the apparatus, said cooling vessel having a first cooling hole into which said first capsule can be slidably fitted on said first side and a second cooling hole into which said second capsule can be slidably fitted on said first side;
(c) a heating vessel containing a high temperature third thermal medium, said heating vessel having a first heating hole into which said first capsule can be slidably fitted on said second side and a second heating hole into which said second capsule can be slidably fitted on said second side;
(d) means for reciprocally and periodically moving said capsule in a manner that said first capsule is moved into said first cooling hole on said first side while simultaneously said second capsule is moved into said second heating hole on said second side and, then, reversely, said first capsule is moved into said first heating hole on said second side while simultaneously said second capsule is moved into said second cooling hole on said first side; and
(e) means for cooling either capsule at a time that has been moved into the corresponding cooling hole on the first side thereof so that said first thermal medium adsorbed in said moisture adsorbent in the capsule having moved into the cooling hole evaporates and adsorbed by said adsorbent within the same capsule while the capsule is cooled, whereby said second thermal medium in said cooling vessel is cooled because of a latent heat of evaporation of the first thermal medium, simultaneously, the other capsule that has been moved into the corresponding heating hole on the second side thereof is heated by said heating vessel, so that said first thermal medium adsorbed in said adsorbent in the capsule is desorbed and released from aid adsorbent and the so released first thermal medium is again absorbed by said moisture absorber within the same capsule;

wherein said first cooling hole and said second cooling hole contain a fourth thermal medium and said first cooling hole and said second cooling hole are communicated with each other so that said fourth thermal medium in said first cooling hole can shift into said second cooling hole and, reversely, said fourth thermal medium in said second cooling hole can shift into said first cooling hole when said second capsule slides into said second cooling hole.

4. An adsorption cooling apparatus, comprising:
(a) a hermetically sealed capsule having a first side and a second side and containing a first thermal medium therein, said capsule further containing a moisture absorber on aid first side that can absorb said first thermal medium and an adsorbent on said second side that can adsorb said first thermal medium at a low temperature and can desorb said first thermal medium at a high temperature;
(b) a cooling vessel containing a second thermal medium, said cooling vessel being capable of performing heat exchanging said capsule on aid first side;
(c) means for heating said capsule on aid second side;
(d) means for periodically moving said capsule to a cooling position and a heating position alternately, said cooling position being a position where said capsule performs heat exchanging with said cooling vessel and said heating position being a position where said capsule is heated by said heating means; and
(e) means for cooling said capsule only when said capsule has moved to said cooling position so that said first thermal medium adsorbed in said moisture absorber evaporates within said capsule and then adsorbed by aid adsorbent while said capsule is cooled by said cooling means, whereby said second thermal medium in said cooling vessel is cooled because of a latent heat of evaporation of the first thermal medium, said adsorbent being heated by said heating means when said capsule is moved to said heating position so that said first thermal medium having been adsorbed in said adsorbent is desorbed and released from said adsorbent and the so released first thermal medium is absorbed by said moisture absorber;

wherein said means for cooling said capsule includes heat dissipating fins externally mounted on said capsule and a cooling fan to produce a cooling airflow, said fins being disposed in a manner that said fins are subjected to said airflow only when said capsule has moved to said cooling position.

* * * * *